United States Patent [19]

Morin

[11] Patent Number: 4,490,869
[45] Date of Patent: Jan. 1, 1985

[54] BOARDING INSTALLATION, ESPECIALLY FOR VEHICLES TRANSPORTING PASSENGERS BETWEEN AN AIR TERMINAL AND AN AIRCRAFT

[75] Inventor: André Morin, Parthenay, France

[73] Assignee: SOVAM, Parthenay, France

[21] Appl. No.: 328,652

[22] Filed: Dec. 8, 1981

[30] Foreign Application Priority Data

Dec. 15, 1980 [FR] France ................................ 80 26589

[51] Int. Cl.$^3$ .............................................. E01D 1/00
[52] U.S. Cl. ...................................... 14/71.5; 14/71.7
[58] Field of Search ...................... 14/71.5, 69.5, 71.7, 14/72.5

[56] References Cited

U.S. PATENT DOCUMENTS

| 2,778,674 | 1/1957 | Attendu | 14/71.5 X |
| 3,263,253 | 8/1966 | Wollard | 14/71.5 |
| 3,263,254 | 8/1966 | Wollard | 14/71.5 |
| 3,315,291 | 4/1967 | Wollard | 14/71.5 |
| 3,317,942 | 5/1967 | Wollard | 14/71.5 |
| 3,541,626 | 11/1970 | Eggert | 14/71.5 X |
| 3,588,934 | 6/1971 | Van Marle | 14/71.5 |
| 3,606,626 | 9/1971 | Eggert | 14/71.5 X |
| 3,693,204 | 9/1972 | Eggert | 14/71.5 |
| 4,110,859 | 9/1978 | Lichti | 14/71.5 |

Primary Examiner—Ernest R. Purser
Assistant Examiner—Beverly E. Hjorth
Attorney, Agent, or Firm—John S. Hale

[57] ABSTRACT

This invention concerns a boarding installation for vehicles for transporting passengers in air terminals comprising a support equipped with a pivoting plate and a counter-plate which are complementary, of the form of an arc of a circle, and means for controlling the pivoting.

6 Claims, 6 Drawing Figures

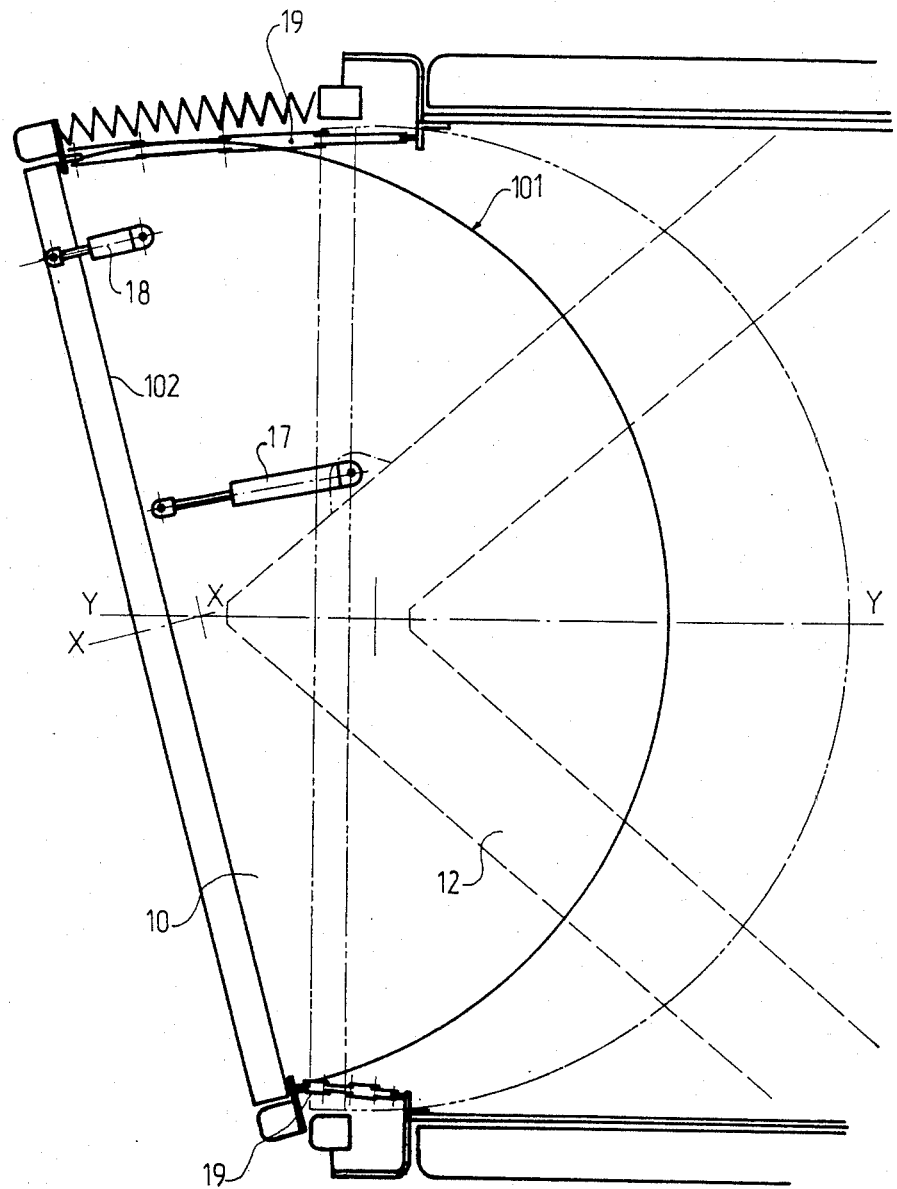
FIG_3
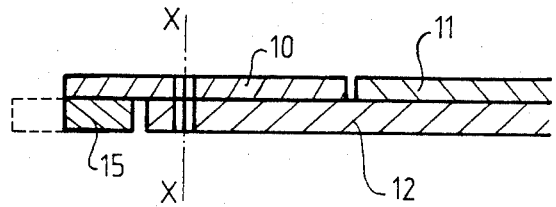
FIG_5

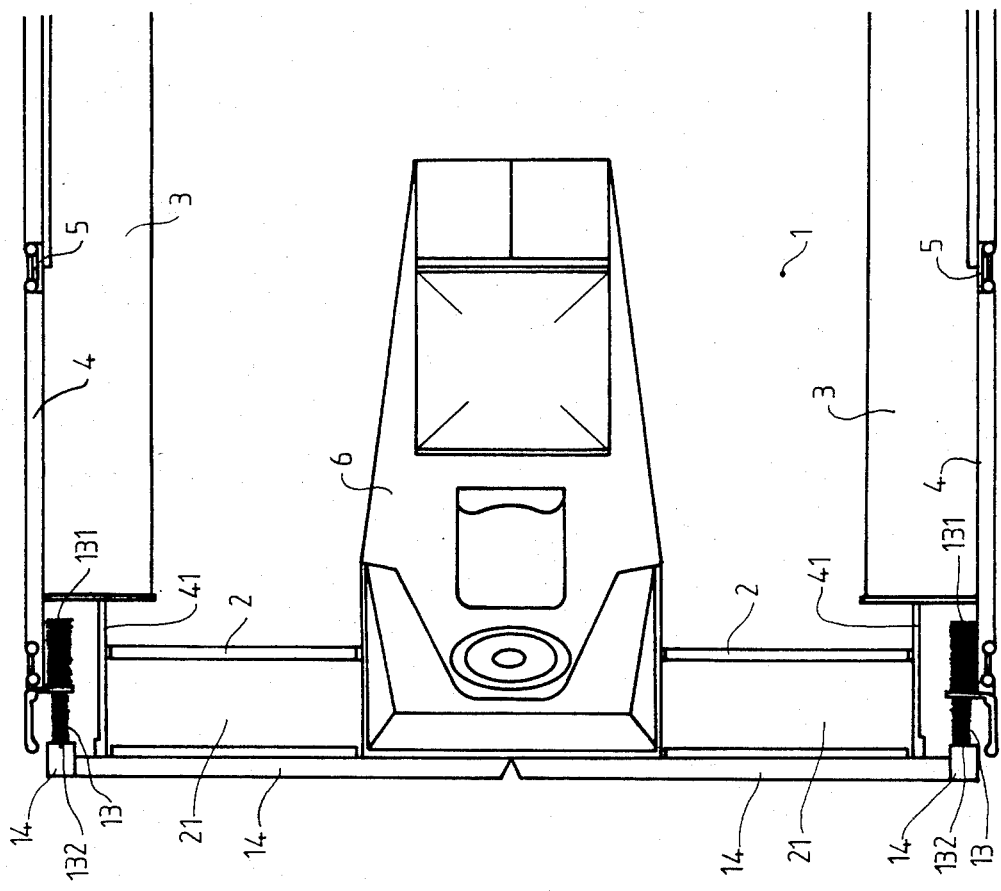
FIG_4

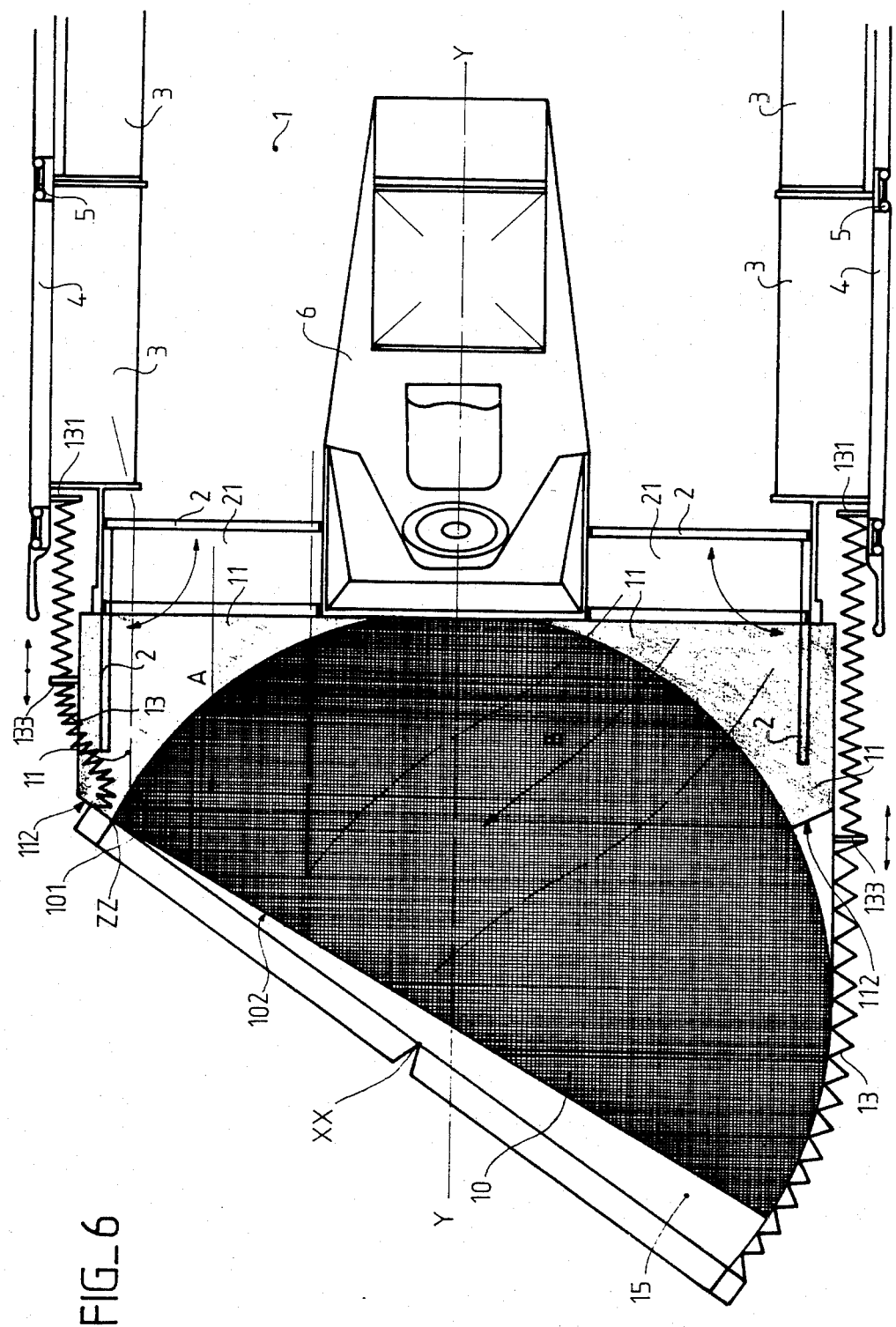

BOARDING INSTALLATION, ESPECIALLY FOR VEHICLES TRANSPORTING PASSENGERS BETWEEN AN AIR TERMINAL AND AN AIRCRAFT

The present invention relates to a boarding installation for vehicles transporting passengers between an air terminal and an aircraft.

Various installations exist for embarking and disembarking passengers, between an air terminal and the aircraft. Among these systems one consists in transporting the passengers in special vehicles in the form of motor buses of large dimensions which are, or place themselves, at a certain height; they can be raised or lowered so that firstly they place themselves level with the air terminal, in order to embark the passengers, then they are lowered to travel the distance between the air terminal and the aircraft, and finally they are raised afresh to come level with the opening in the aircraft.

In general these vehicles comprise a cabin which opens completely at the front or rear. The opening of the vehicle cabin and the opening of the aircraft are connected by a mobile platform, generally in the form of mutually overlapping elements which extend out telescopically in a combined linear and pivoting movement; the asembly is closed by a bellows element to form a corridor. This telescopic equipment formed by the platform and the bellows element is movable between a retracted position and an advanced position, according to the distance separating the opening of the vehicle cabin from the opening of the aircraft.

This bellows element protects the passengers not only against falling but also against rain and more generally inclement weather.

In practice it is impossible in most cases for he driver of the vehicle to bring the vehicle absolutely perpendicular to the fuselage opening both by reason of encumbrances at ground level (baggage unloading equipment, supplies replenishment, etc.) and by reason of the curved form of the fuselage. Thus it is necessary that the boarding installation of the vehicle should be able to close the interval remaining between the aircraft and the front of the vehicle. Now for the above reasons this interval is in the form of a trapezium and not a rectangle.

The known installation (FR. Pat. No. 78 36 778) has a floor formed of telescopic plates and the front is constituted by two half-plates pivotable in relation to the others and independent of one another in such manner as to adapt themselves to the very greatly curved form of the fuselage, especially for the opening close to the nose of the aircraft.

Moreover the two articulated plates overlap one another in order to leave no interval between them, according to the pivotal position.

Now this piling of plates causes excess thicknesses which, while slight, are none the less perceptible.

Finally the two articulated plates come beneath an inclined surface constituting the prolongation of the floor of the vehicle.

The result overall is a surface which, while filling the gap between the actual vehicle and the fuselage of the aircraft or the air terminal platform, is nevertheless irregular in height and thus dangerous.

At the moment of coming alongside the vehicle driver controls firstly the translational extension and then the pivoting of one or both of the forward plates.

Although this installation completely closes the gap, it has the drawback of having a telescopic floor. Although an inclined surface is interesting, it appears in practice that an inclined surface is relatively tricky for walking, in comparison with a stairway. This difficulty is still greater when it is a matter of a surface formed by plates which are not level with one another but superposed each time, having an extra thickness. Now in the case of this known installation the extra thicknesses are not seen as parallel edges but inclined in relation to one another in unforeseeable manner.

Now both in embarkation and in disembarkation the passengers press or even jostle one another, and they cannot see the incline which they are entering; to this there is added a certain clumsiness or numbness due to prolonged sitting.

The present invention has the purpose of creating a boarding installation which is telescopic and the front of which is pivotable, but which has as smooth and regular an upper surface as possible, whatever are the positioning conditions, in order to permit rapid passage of persons or trolleys in safety and without difficulty, while being simple of realisation and not prohibitive of cost.

To this end the invention relates to a boarding installation for vehicles for transporting passengers between the platform of an air terminal and an aircraft, which installation is composed of telescopic plates and bellows elements forming a tunnel, which is extended between the exit of the vehicle and the aircraft or the air terminal platform, characterised in that it comprises a support carrying a pivoting plate and a counter-plate, the counter-plate being fixed, the pivoting plate having a rear edge in the form of an arc of a circle and the counter-plate having a forward edge which comes edge-to-edge with the rear edge of the plate, also means for control of the telescopic movement of the assembly between a withdrawn position and an extended position, and means for control of the pivoting movement of the pivotable plate.

Thanks to the plate and the counter-plate which are level with one another and complete one another without interval, the whole surface of the installation, in the gap between the aircraft and the vehicle, is smooth, regular and even horizontal. The only inclined surface is at the transition between the surface of the extended part and the entry (or exit) of the vehicle.

As the vehicle always has a much greater width than the opening of the aircraft, the passengers are more widely spaced from one another in this transition zone; they can see the inclined surface which moreover is naturally parallel to the front of the vehicle, and they can carry out the appropriate manoeuvres without trouble and without retarding the movement of the passengers.

As the pivoting plate is single, this simplifies the formation especially of the support and the pivoting control system.

According to another characteristic the support is of triangular form, with the short side situated forward, and reaches as far as the level of the axis of pivoting of the pivotable plate; thus the plate can pivot through a large angle permitting the vehicle to come alongside at an angle very different from a right angle. For the same reason it is of interest that the forward extremities of the branches of the counter-plate should be truncated so as not to remain protruding when the plate swivels towards one or the other extreme position.

As the width of the vehicle is much greater (three to four times) than the width of the aircraft door, the pivoting plate does not necessarily correspond to this width. However, with an aim of simplification, it is of interest that the plate should be a semi-circle of diameter close to the width of the vehicle. In this way the telescopic corridor covers not only the opening but also the leaf of the door. In this case, and to take account of the very curved form of the fuselage of certain aircraft in the region of the doors, as a safety measure there is provided a segment or sector movable telescopically in relation to and beneath the plate; as this sector merely constitutes a safety means for avoiding falling of an object or to ensure closure against bad weather, but is in no case situated in or in the proximity of the path of the passengers, it constitutes no inconvenience.

Finally as the total number of parts in motion is reduced, their driving is simple; it is prefereably effected by cylinderpiston units.

The present invention will be described in greater detail with the aid of the accompanying drawings, wherein:

FIG. 3 is a diagram of the structure of the device, in plan view;

FIG. 4 is a view analogous with FIGS. 1 and 2, showing the extending device in the retracted position;

FIG. 5 is a longitudinal sectional view;

FIG. 6 is an exceptional case on Door 4G of a Boeing 747 aircraft.

Figure 1:
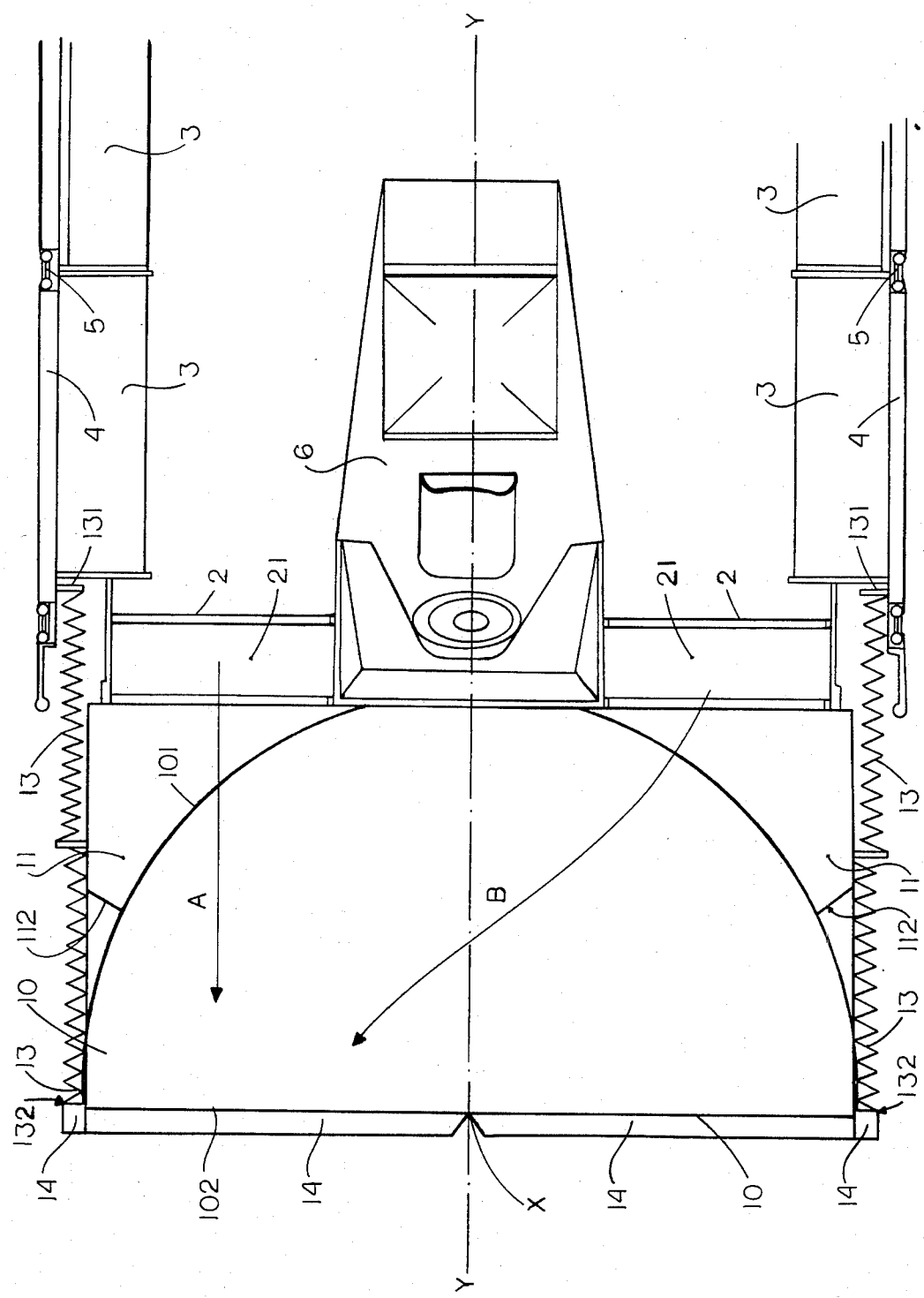
FIG. 1 is a partial plan view of a vehicle equipped with an extending device according to the invention, this device being in the extended position.

FIG. 1 is a plan view of the front (or the rear) of a passenger transport vehicle. This vehicle comprises a cabin 1 for the passengers. The front of the cabin 1 is closed by two doors 2 and the lateral walls 4 are equipped with benches 3. In the example as represented, these walls are constituted by elements of curved form united in the region of the joints 5. The cabin is equipped with a driver's station 6 placed on the axis Y—Y of the vehicle.

The boarding installation as described below is situated beneath the inclined zones 21 in front of the doors 2, forming the junction between the floor level of the cabin 1 of the vehicle and the level of the boarding installation. In this way the transition is parallel to the front (or rear) face of the vehicle.

Figure 2:
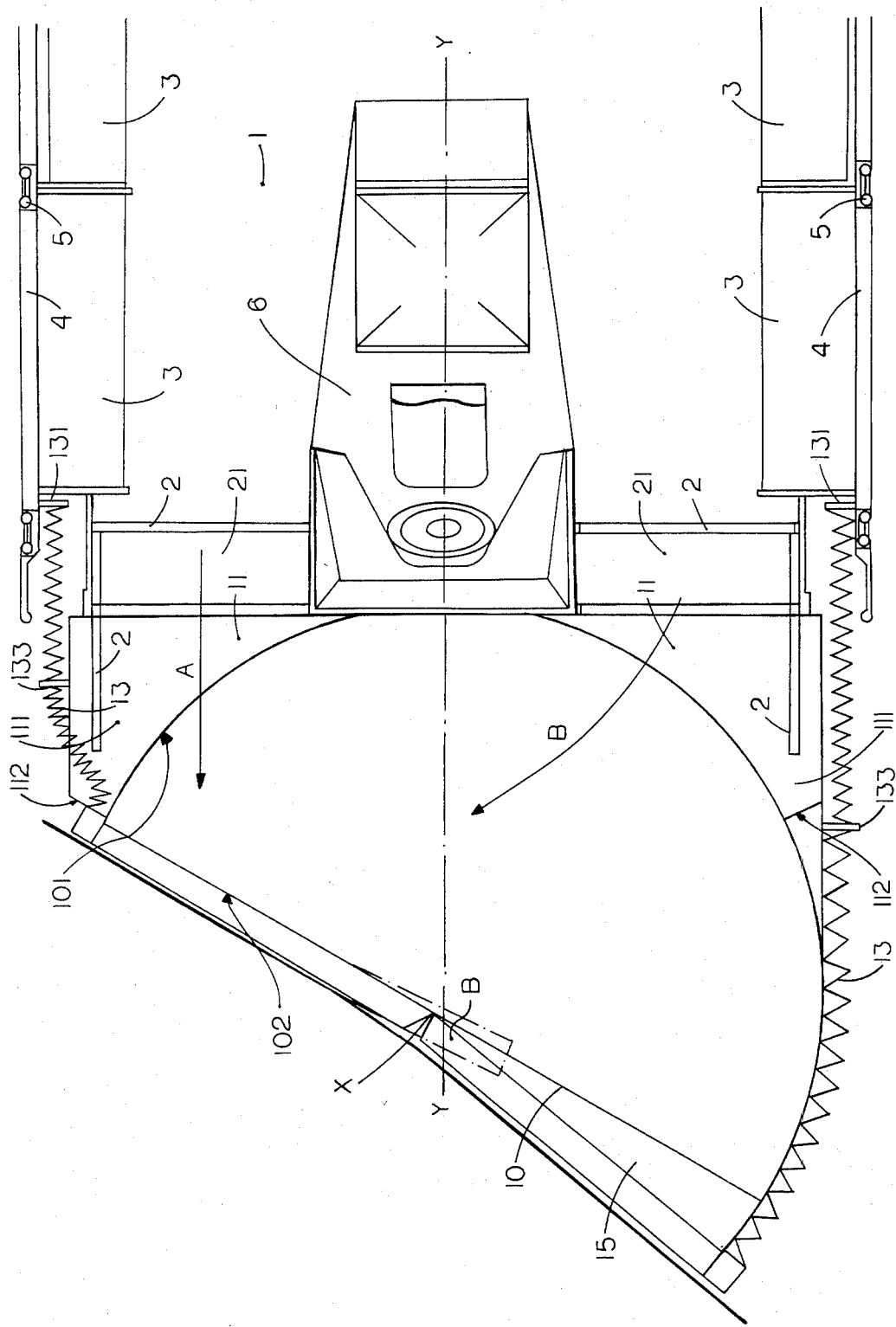
FIG. 2 is a view analogous with FIG. 1, showing the device in the extended and pivoted position.

According to FIGS. 1 to 3, the boarding installation is composed of a pivotable plate 10 and a counter-plate 11, which are carried by a support 12 (FIG. 3).

The assembly 10, 11, 12 is telescopically movable in translation in relation to the vehicle 1 and the plate 10 is pivotable in relation to the counter-plate 11.

The rear edge 101 of the plate 10 is in the form of an arc of a circle, the plate 10 constituting a half disc.

The corresponding edge (not referenced) of the counter-plate 11 likewise has the form of an arc of a circle of the same radius as that of the plate 10. Thus the plate 10 is placed edge-to-edge against the counter-plate 11 leaving only the interval necessary for the pivoting movement. The plate 10 can pivot in relation to the counter-plate 11 about the geometrical axis X—X so that its forward edge 102 can incline appropriately in relation to the longitudinal axis Y—Y of the vehicle 1 (FIG. 2).

To permit this pivoting of the plate 10, for example into the position according to FIG. 2, the extremities 112 of the branches 111 of the counter-plate 11 are truncated substantially in alignment with the edge 102 occupying one or the other of the extreme swivelling positions.

As this installation comprises only one movable plate 10, the retention of this plate and the control of its movement are realisable with the aid of simple means. The form of the support (FIG. 3) is triangular, with the point turned forward to the level of the pivoting axis X—X.

At the level of the forward edge 102 of the plate 10 a supplementary sector 15 is provided which pivots in relation to and beneath the plate 10 in order more easily to match the curved form of the fuselage or other, according to one particular form of embodiment; in order to increase the flexibility of use of the vehicle the installation comprises a supplementary sector 15 the length of which corresponds to half of the length of the edge 102.

In fact in practice, for safety reasons, the boarding installation is positioned on the door, before the door is opened. Thus it is necessary that the width of the tunnel thus formed should correspond to at least double the width of the leaf B of the door. Therefore only one half of the forward edge 102 serves for the passage of persons, while the other half is situated beneath the door leaf B, which is turned back against the fuselage on the side where the supplementary sector 15 is situated.

According to FIG. 3, the pivoting movement of the plate 10 is controlled by the cylinder-piston unit 17, while that of the sector 15 is controlled by the cylinder-piston unit 18.

On the sides and the upper part the installation is equipped with a bellows element 13 fixed on the one hand at 131 to the lateral wall 4 and on the other at 132 to the front of the device, to the pad 14 of flexible material intended to be applied to the aircraft fuselage wall without damaging it.

The width of the vehicle is much greater than the width of the door P, represented diagrammatically in FIG. 2. Thus when the two doors 2 of the vehicle 1 are opened, the passengers travel in the direction of the arrows A and B on the paths indicated in broken lines (FIG. 2).

In fact the vehicle is positioned against the opening P of the fuselage of the aircraft in such manner that, in the example as represented, the right half (upper half in FIGS. 1 and 2) is facing the opening P, while the left half, that is to say the lower half in FIGS. 1 and 2, faces the fuselage.

In the course of this positioning the driver pivots the plate 10 to place the edge 14, 102 of the plate 10 into alignment with the door P; then according to need the driver causes the sector 15 to advance so as to close the angle existing between the edge of the left half of the plate 10 and the fuselage.

It is of little importance that this sector 15 is not in line with the plate 10, since the travellers do not pass into this zone but follow the tracks A and B.

It is however not unnecessary for this angle to be closed, in order to avoid accidents in case of jostling, or simply the effect of vertigo (the aircraft door is sometimes 5.60 metres above the ground), or again to avoid the entry of cold or hot air.

According to the door of the aircraft, an exceptional case can arise. FIG. 6 shows us that the sector 15 can then be driven in rotation about an axis Z—Z situated at the right extremity of the edge 102 of the plate 10. In this particular case the rotation of 15 about the axis X—X is prevented by construction, thus the edge 102 remains straight, which is satisfactory in the context of the specific case envisaged (Boeing 747, Door 4G).

In FIG. 1 the boarding installation is represented in the extended position, by telescopic translation of the plate 10 and the counter-plate 11, but without the plate 10 being pivoted.

FIG. 2 shows the installation pivoted through 15° to the right to come alongside the aircraft.

This Figure also shows the supplementary pivoting of the element 15 through 10°.

FIG. 2 likewise shows the movement of the bellows element 13 which is deformed more or less about elements 133 which are connected to pantographs 19 controlled by hydraulic piston-cylinder units to come against the aircraft fuselage, pressing by the upper lip 14.

The bellows element 13 is fixed to the outer edges 102 of the pivoting plates 10 and 15, in the parts where these plates protrude; in the other parts (upper parts in FIG. 2) the bellows element is more or less compressed to remain outside the passageway and permit opening of the doors 2 in the cleared position.

FIG. 3 is a diagram showing the above-described installation in two positions of advancement of the plate 10 and the element 15.

FIG. 4 shows the installation in the retracted position which should be adopted for driving in order to clear the view as far as possible for the driver situated at the station 6. This retracted position also offers the advantage of not subjecting the bellows elements to harmful stresses when the vehicle is in motion. In this position the bellows element 13 is lodged in the interval existing in front of the benches 3, between the outer partition 4 and the inner partition 41.

FIG. 5 is a vertical sectional view parallel with the longitudinal axis of the vehicle, along the section line Y—Y in FIG. 1. The section shows the respective arrangement of the support 12 integrally carrying the counter-plate 11. The plate 10, the thickness of which is equal to that of the counter-plate 11, is mounted to pivot about the axis X—X. Finally the supplementary sector 15 is carried by the plate 10, beneath it.

The present invention has been described above by way of example in the case of a boarding installation especially for vehicles transporting passengers between an air terminal and an aircraft or vice versa. Such an application is not limitative since the invention can be applied to any mobile contrivance which comes alongside an installation which is itself fixed or mobile. For example, in the field of air transport, the invention can also apply to catering lorries for replenishing supplies of aircraft, or equally to gangway heads for access for passengers between air terminals, aircraft, etc.

I claim:

1. Boarding installation for vehicles transporting passengers between the platform of an air terminal and an aircraft, which installation is composed of telescopic plates and bellows elements forming a tunnel which is extended between the exit of the vehicle and the aircraft or the air terminal platform comprising a support carrying a pivoting plate and a counter-plate, the pivoting plate having the shape of half a circular disc with a rear edge in the form of an arc of a circle, the pivoting plate having a pivoting axis around the center of said circle, the counter-plate being fixed on the support, having an edge in the form of an arc of a circle of the same radius as the poviting plate and this edge of the counter plate coming in edge to edge contact against the rear edge of the plate, the pivoting support having a triangular shape with a vertex thereof reaching the pivoting axis of the plate, a supplementary sector pivoting telescopically in relation to and beneath the pivoting plate through a small angle on one half of the forward edge of the pivoting plate, means for controlling the telescopic movement of the assembly between a retracted position and an extended position, means for controlling the pivoting of the pivoting plate, and means controlling the pivoting of the sector.

2. A boarding installation according to claim 1, in which the counter-plate further comprises branches at opposite ends of said edge in the form of an arc, and in which forward extremities of the branches of the counter-plate are truncated.

3. A boarding installation according to claim 1, in which the pivoting plate has a width corresponding to the width of the boarding installation.

4. A boarding installation according to claim 1, in which the supplementary sector pivots about the pivoting axis of the pivoting plate.

5. A boarding installation according to claim 1 in which the supplementary sector is movable pivotingly according to choice about one axis of a group of two axes, of which one is blocked when the other is in use.

6. A boarding installation according to claim 1, further comprising cylinder-piston units for controlling the telescopic movement and the pivoting of the pivoting plate and the supplementary sector.

* * * * *